(12) United States Patent
Courier (10) Patent No.: US 8,931,715 B2
(45) Date of Patent: Jan. 13, 2015

(54) AIRLESS PLURAL COMPONENT SPRAY GUN

(71) Applicant: John P. Courier, Renton, WA (US)

(72) Inventor: John P. Courier, Renton, WA (US)

( * ) Notice: Subject to any disclaimer, the term of this patent is extended or adjusted under 35 U.S.C. 154(b) by 0 days.

(21) Appl. No.: 14/176,286

(22) Filed: Feb. 10, 2014

(65) Prior Publication Data

US 2014/0224898 A1 Aug. 14, 2014

Related U.S. Application Data

(60) Provisional application No. 61/763,396, filed on Feb. 11, 2013.

(51) Int. Cl.
*B05B 1/28* (2006.01)
*B05B 7/00* (2006.01)

(52) U.S. Cl.
CPC ..................... *B05B 7/005* (2013.01)
USPC .......................... 239/112; 239/114

(58) Field of Classification Search
CPC ............. B05B 15/0225; B05B 15/208; B05B 15/0241; B05B 11/3053; B05B 12/00; B05B 12/14; B05B 12/002; B05B 12/1409; A61G 11/00; G05G 7/00; G05G 7/14
USPC ......... 239/114, 115, 116, 526, 112, 117, 527, 239/401, 407, 416, 413, 433
See application file for complete search history.

(56) References Cited

U.S. PATENT DOCUMENTS

| | | | | |
|---|---|---|---|---|
| 1,372,280 | A | * | 3/1921 | Colmar .......................... 239/117 |
| 3,606,170 | A | | 9/1971 | Hoffman et al. |
| 4,453,670 | A | | 6/1984 | Sirovy |
| 4,545,288 | A | * | 10/1985 | Burke .............................. 92/5 R |
| 4,957,239 | A | * | 9/1990 | Tempelman .................. 239/117 |
| 5,829,679 | A | | 11/1998 | Strong |
| 6,883,735 | B2 | * | 4/2005 | Ganzer ......................... 239/594 |
| 7,694,893 | B2 | | 4/2010 | Zittel et al. |

\* cited by examiner

*Primary Examiner* — Melanie Tyson
*Assistant Examiner* — Viet Le
(74) *Attorney, Agent, or Firm* — Tracy Jong Law Firm; Cheng Ning Jong; Louis Reale (57) ABSTRACT

A plural component spray nozzle comprising a nozzle block having two feed passageway and a main passageway. The main passageway is configured to receive one material through each feed passageway. There is a receiver block having two receiver channels. Each receiver channel comprises an entry port on one end and an exit port on another end. The receiver block is configured to selectively receive the nozzle block in actuated or blocked position. In the actuated position, the exit ports of the receiver channels are fluidly connected with their corresponding feed passageways. In the blocked position, the exit ports of receiver channels are fluidly blocked with their corresponding feed passageways.

18 Claims, 10 Drawing Sheets

FIG. 12

AIRLESS PLURAL COMPONENT SPRAY GUN

PRIORITY CLAIM AND RELATED APPLICATIONS

This non-provisional application claims the benefit of priority from provisional application U.S. Ser. No. 61/763,396 filed on Feb. 11, 2013. Said application is incorporated by reference in its entirety.

BACKGROUND OF THE INVENTION

1. The Field of the Invention

The present invention is directed generally to a plural component spray gun. More specifically, the present invention is directed to an airless plural component spray gun capable of applying plural components without the additional equipment, e.g., air hoses, ports, compressor, etc., necessary to enable prior art applications, power sources to run such equipment and problems associated with using such equipment, e.g., overspray, maintenance costs, downtime and the like.

2. Background Art

Spray foam has been in use for about 50 years. Polyurea/urethane fast-set elastomeric coatings have been in use for about 20 years. For coatings and the like, two-part self-setting compounds may be mixed in a desired ratio and applied to the target surface or part. Compounds react quickly, yet the foam or coatings are sprayed at typically from 1-3 Gallons Per Minute (GPM). In most applications, the components mix within the plural component spray gun just before exiting to the target surface.

One of the biggest complaints about current spray foam equipment including the spray gun is that the equipment is difficult to learn to use, and is prone to failure due to too many electronics and related equipment that is not easy for the layman contractor/sprayer to troubleshoot and fix. Down time of spray foam equipment is costly, and can prevent timely completion of projects. Moreover, replacement parts are expensive and may require significant lead times to acquire.

Another problem in the industry is that most modern proportional spray foam systems do not provide the desired ratio of components, for example a 1:1 by volume ratio for the spray components. Typically, current systems therefore deliver a mixture that does not have the proper stoichiometry or the best physical properties of the components. Another disadvantage of prior art systems is that they frequently heat the components while they are still in the drum, which can cause problems. For example, heating the components prior to pumping will lower the viscosities and can cause striation, resulting in premature expansion of the B resin foam, which is then impractical to pump. The lowered viscosity may also cause leaking at the pump seals.

Yet another disadvantage of prior art systems is the use of pneumatic drive systems for the pumps, requiring a large volume of pressurized air. Suitable pneumatic systems are noisy, dirty and require larger air compressors.

Yet another disadvantage of prior art spray guns is the large number of parts required to enable spray gun and the large number of parts that must be disassembled for cleaning and reassembled.

Particular illustrative examples of applications for spray foam systems include, without limitation, (i) building insulation; (ii) roofing insulation; (iii) marine craft floatation material and motor vehicle crash space volumes; (iv) pipe insulation; (v) foam molding of parts, including for example wave boards; (vi) insulation for commercial freezers and refrigeration systems; (vii) commercial specialty building domes that are otherwise difficult to insulate; (viii) concrete leveling; (ix) prosthetic bones for training; (x) flotation items, including for example docks; (xi) props for type entertainment centers, for example fake rocks for resorts; (xii) military tent insulation; and the like.

Particular illustrative example of applications for polyurea/urethane elastomeric coatings include, without limitation: (i) floors; (ii) pickup truck bed liners; (iii) secondary containment, for example sewage clarifiers; (iv) military bullet proofing and bomb-fragment protection; (v) roof coatings; (vi) injection molding; and the like.

Both the spray foam industry and the polyurea/urethane elastomeric coatings industry use the same or similar equipment, and are collectively referred to herein as "spray foam equipment," "spray system" or similar phraseology. Typically, polyurea/urethane elastomeric coatings simply use higher heat and pressure.

U.S. Pat. No. 7,694,893 to Zittel, et. al. (hereinafter Zittel) discloses a plural component spray gun designed for spraying quick setting materials such as foams, polyurea and the like. According to Zittel, its gun is designed so as to be easily serviceable with a minimum of tools. For example, the side seal cartridges may be installed and removed without tools by removing the retaining ring and then extracting them from the fluid housing. Those cartridges are purported to be easily disassembled and cleaned. Similarly, the fluid housing is purported to be removed from the handle/body by unscrewing the lock ring by hand. It shall be immediately appreciated that Zittel's spray gun includes numerous parts and operates with the aid of a supply of compressed air. Zittel's design therefore does not lend itself to easy dismantling, accounting of parts after Zittel's spray gun has been dismantled and reassembly of the parts after cleaning. A cleaning process for Zittel's spray gun is not only time consuming but is also a risky process where various parts may be lost or incorrectly reassembled.

U.S. Pat. No. 5,829,679 to Strong (hereinafter Strong) discloses a plural component airless spray gun for reactive liquid materials which has a mix chamber into which coreactive liquid components are introduced and mixed, an airless tip at a forward outlet from the chamber from which the mixed components are emitted in a fan-shaped spray, and a mechanically operated purge rod for cleaning residual reactants from the mix chamber and airless tip. The purge rod has a main body of a diameter slightly less than that of the mix chamber and a probe at its forward end that geometrically conforms to and is adapted to enter into and clean the inside of the spray tip. During spraying the purge rod is retracted in the mix chamber rearwardly of liquid reactant inlets to the chamber. As shown in Column 4 lines 35 to 45 of Strong below, Strong involves the use of an air cylinder although it is pitched as an airless spray gun:

"To turn the spray gun 20 on and off and to mechanically clean the mix chamber 68 and the interior of the airless tip 70 of residual reactive material upon termination of spraying, the spray gun has a purge rod 78. The purge rod extends forwardly into the mix chamber from a forward end of a drive rod 80 that is reciprocated in longitudinal directions by the air cylinder and piston assembly 24. The purge rod has a cylindrical main body 84 of a first diameter that makes a close sliding fit with the mix chamber. The purge rod also has a cylindrical part 86, for cleaning the airless tip passage 74, that extends forwardly from the main body 84." (emphasis supplied)

U.S. Pat. No. 4,453,670 to Sirovy (hereinafter Sirovy) discloses a plural component flushless spray gun which has a fluid outlet orifice defined by two opposed inlet orifices with a thin blade interposed therebetween. The blade prevents fluidic material exiting each inlet orifice from flowing directly into the other, and is slotted at its forward end to define a very small volume chamber into which the components flow for mixing prior to being emitted through the outlet orifice defined at the forward end of the slot. Because the chamber has a very small volume, the components are intimately mixed for better polymerization, and only a very small quantity of reactive components are mixed within the gun immediately behind the outlet orifice. Consequently, should the mixed components harden within the gun, only a limited amount of material is involved and the blockage may readily be removed simply by triggering the gun on to eject the blockage through the outlet orifice. The spray gun of Sirovy involves three mechanically moving valving rods with the center one having a blade in an attempt to get rid of the solvent used. Significant waste is generated as a result of the use of the solvent.

U.S. Pat. No. 3,606,170 to Hoffman, et. al. (hereinafter Hoffman) discloses a plural component spray gun which is utilized, for example, in the spraying of plastic foams. Pressurized fluid components flow through the spray gun where they are mixed together and discharged through a spray nozzle. The spray gun includes a spray head mounted on a spray gun body. The spray head defines a plurality of valve chambers which are located on longitudinally extending and parallel major axes. A valve assembly is positioned in each of the valve chambers and each of the valve assemblies includes a fluid discharge opening. A nozzle assembly, which includes a mixing plate is removably mounted on the front end of the spray head. The mixing plate is closely adjacent the discharge ends of the valve assemblies. The mixing plate defines a passageway network which is in communication with each of the fluid discharge openings. The plural components are fed through the passageway network upon the operation of a triggering apparatus. A second triggering apparatus is connected to another one of the valve assemblies and is utilized to direct solvent into the passageway network during the cleaning of the spray gun. In using Hoffman's spray gun, the spray gun is immediately purged with a third component, e.g., a solvent and therefore a container is required to collect this waste. This spray gun many work for very slow mixing components but significant waste disposal problems arise as a result of purging with a solvent.

Yet other types of spray guns have been attempted but all fail to satisfy consumer needs as the spray guns require the use of compressed air and the equipment associated with such use. Among spray guns which have been attempted but found to be undesirable, are those using air purge. The part count for such spray guns is numerous and the labor involved in cleaning such spray guns is tremendous.

SUMMARY OF THE INVENTION

The present invention meets the above-identified needs by providing an airless plural component spray gun configured for spraying plural components without requiring numerous component parts which must be disassembled and cleaned.

The present plural component spray nozzle includes:

(a) a nozzle block comprising a mixing chamber having at least one feed passageway, where the at least one feed passageway having an entry port on a first surface and an exit port; and (b) a receiver block comprising at least one receiver channel adapted to receive a material, the at least one receiver channel includes an entry port disposed at one end and an exit port at another end on a second surface, wherein the first surface is adapted to move relative to the second surface such that when the entry port of the at least one feed passageway is disposed in alignment with the exit port of the at least one receiver channel, the at least one feed passageway is in communication with the at least one receiver channel and when the entry port of the at least one feed passageway is not disposed in alignment with the exit port of the at least one receiver channel, the at least one feed passageway is not in communication with the at least one receiver channel.

In one embodiment, each of the first surface and the second surface is a planar surface.

In one embodiment, the mixing chamber includes a first feed passageway having a central axis and a diameter, a second feed passageway having a central axis and a diameter and a main passageway having a central axis and a diameter. The main passageway is configured to receive a first material through the first feed passageway and a second material through the second feed passageway.

In one embodiment, each of the central axis of the first feed passageway, the central axis of the second feed passageway and the central axis of the main passageway is substantially rectilinear.

In one embodiment, each of the diameter of the first feed passageway and the diameter of the second feed passageway ranges from about 0.016 inch to about 0.052 inch and the diameter of the main passageway ranges from about 0.06 inch to about 0.093 inch.

In one embodiment, the present spray gun further includes a pole having a first end and a second end, where the first end is pivotably connected to the receiver block such that the pole is pivotably disposed at an angle to the receiver block. In one embodiment, the angle ranges from about 0 to about 30 degrees. In one embodiment, the present spray gun further includes an actuation mechanism disposed on the second end.

Accordingly, it is a primary object of the present invention to provide a plural component spray gun that is simple, easy to operate and capable of commercial applications without problems associated with equipment and labor costs, maintenance downtime and steep learning curve especially in maintaining the prior art spray guns.

It is another object of the present invention to provide a plural component spray gun that is free from numerous air components and parts and O-ring replacement.

It is another object of the present invention to provide a spray gun capable of being supported with two hands, thereby increasing the reach of a user and reducing fatigue associated with long periods of using the spray gun.

It is another object of the present invention to provide a lightweight spray gun which when used without a pole, allows prolonged use of the spray gun as the user is less likely to require a break due to the weight and when used with a pole, allows the user extended reach.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—spray gun
4—handle
6—receiver block
8—nozzle block
10—main passageway
12—inlet port
14—trigger
16—supply hose
18—supply hose
20—C-shaped lock
22—pin for C-shaped lock
24—cable
26—pole
28—rack actuator
30—fastener for securing rack actuator to handle
32—tilt angle of receiver block with respect to handle
34—angle of handle relative to pole
35—angle of pole relative to receiver block
36—adaptor
38, 40—feed passageway
42—user's hand
44—rack
46—pinion
48—spur gear
50—complementary rack
52—retainer
54—horn
56—spring
58—front face of receiver block
60—first material
62—second material
64—air flow resulting in mixing chamber purging
66—air flow surrounding spray
68—nozzle head
70—mixture of first and second materials
72—mixing chamber
74—receiver channel
76—receiver channel
78—rack
80—stop
82, 84, 86—central axis of passageway
88—length of pole
90—filter
92—spring
94—side seal
96—conical spring
98—check ball
100—ball seat
102—limiter
104—return spring
106—flange
108—valving rod
110—push knob

PARTICULAR ADVANTAGES OF THE INVENTION

The present spray gun does not require the use of pressured air and as a result, the need for any equipment related to producing pressured air, e.g., compressor, high pressure hoses, fittings, etc., and equipment related to enabling pressured air to be delivered to and dispensed from the spray gun and in conjunction with materials intended to be dispensed with the pressured air can be avoided.

As the present spray gun includes few components coming in contacting engagement with materials, which upon mixing, can cause the materials to harden on the components, the present spray gun is easy to clean and involves little labor and downtime compared to prior art air or airless spray guns.

As the present spray gun involves simpler configurations, the level of skills required to use and maintain such gun is lower than conventional spray guns.

As the present spray gun involves few components, the acquisition and maintenance costs for such spray gun is significantly less than prior art air or airless spray guns. In the present spray gun, a desired spray quality of a mixture can still occur with conventional viscosity and temperature (with heating) using the present orifice sizes of passageways of the mixing chamber. In contrast, the additional equipment required in prior art spray guns are not only costly but also include numerous consumable parts, e.g., O-rings.

In one embodiment, the present spray gun is configured with a pole extending from a portion of the present gun, thereby providing grasp points which aid in extending the reach of the spray gun and providing comfort to the use of such spray gun. The present spray gun is configured to be lightweight and without an air supply line, making it possible for the spray gun to be mounted to the pole and for handling the spray gun. A pole equipped spray gun enables the spraying on a flat roof without requiring a user to bend over excessively. When spraying walls, spray width is doubled with the use of a pole, especially when the user is also using a ladder or scaffolding. The user may also keep a distance from overspray on the user's head and face shield when spraying overhead, allowing the user better view out of the face shield and better vision.

In one embodiment, the present spray gun is configured with a pole rotatably mounted to a portion of the present gun, thereby facilitating the orientation at which the present spray gun is held.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
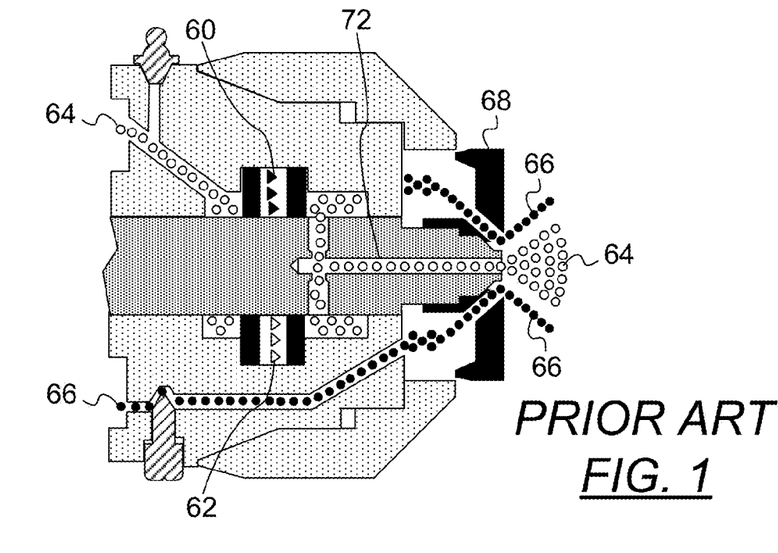
FIG. 1 is one example of a prior art head of a plural component spray gun in a blocked state.
Figure 2:
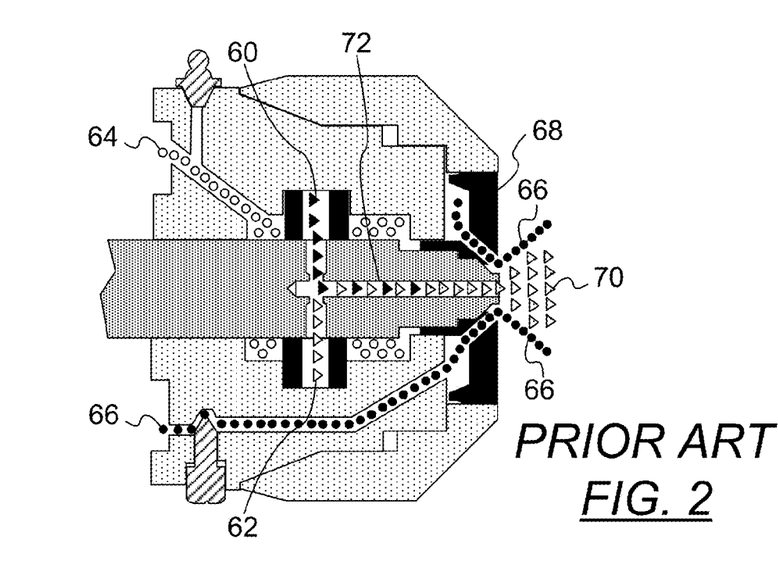
FIG. 2 is one example of a prior art head of a plural component spray gun in an actuated state.

FIG. 1 is one example of a prior art head of a plural component spray gun in a blocked state. FIG. 2 is one example of a prior art head of a plural component spray gun in an actuated state. It shall be noted that the prior art spray gun is configured to use a supply of air to both atomize the sprayed materials as shown in FIG. 2 and purge the mixture of materials from surfaces of the mixing chamber 72 in the nozzle head 68 as shown in FIG. 1 and the tip of the nozzle head 68 as shown in FIGS. 1 and 2. Referring to FIG. 1, material 60 is supplied in a channel ready to be dispensed while material 62 is supplied in another and also ready to be dispensed. In this state, a flow of air is diverted through the mixing chamber where the flow of air is intended to dislodge or purge left-over mixture materials that remain on surfaces of the mixing chamber 72. A flow of air also exits via the tip of the nozzle head 68, further intended to remove left-over mixture materials at the tip of the nozzle head 68. Once the nozzle head is disposed in its actuated position as shown in FIG. 2, materials 60, 62 enter the nozzle head 68, causing mixing to occur to yield a mixture flow which exits via the tip of the nozzle head 68. It shall be noted that, in this state, the flow of air exiting the tip of the nozzle head 68 continues to be supplied and intended to aid in atomizing the mixture flow. Despite the availability of air purge, such a spray gun also includes numerous parts that must be dismantled for service or cleaning after each use and reassembled for use. Air purge also causes overspray which is undesirable especially when used in tight spaces. Air purge in confined areas can cause spray foam back at the user.

Figure 3:
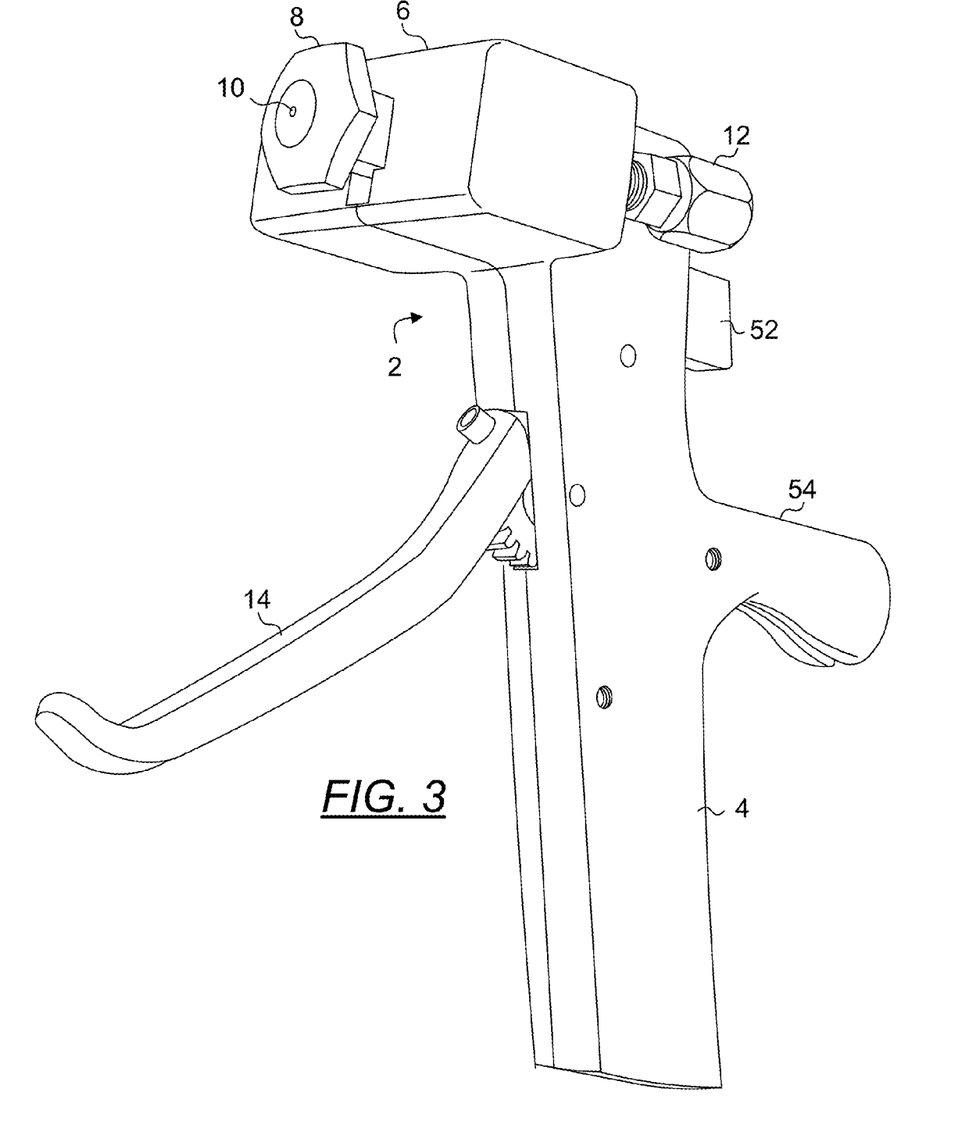
FIG. 3 is a bottom front perspective view according to one embodiment of the present plural component spray gun.

FIG. 3 is a bottom front perspective view according to one embodiment of the present plural component spray gun. It shall be noted that the exterior design of the present plural component spray gun 2 is simple, free from any protrusions or any need for air supply and any necessary equipment for such air supply which can cause entanglement and added weight to the spray gun 2. The spray gun includes a receiver block 6, a handle 4 extending from the receiver block 6, a horn 54 extending from the handle 4 which acts as a stop for secure grasps of a hand 42 and additional grasping surfaces for another hand 42, a trigger 14 conveniently positioned relative to the handle 4, a nozzle block 8 slidingly coupled with the receiver block 6 and inlet ports 12 (only one shown in this view). In one embodiment, the horn 54 extends substantially perpendicularly from the handle 4. The present spray guns are configured for use with materials 60, 62 supplied at about 3,500 lbs per square inch (psi) and up to about 50 lbs per minute.

Figure 4:
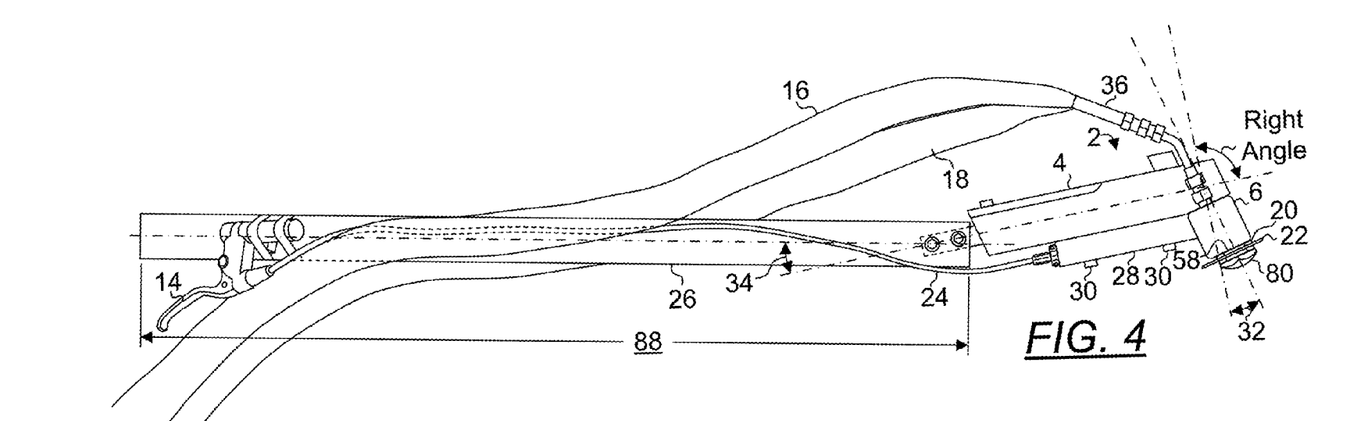
FIG. 4 is an orthogonal view according to another embodiment of the present plural component spray gun.
Figure 5:
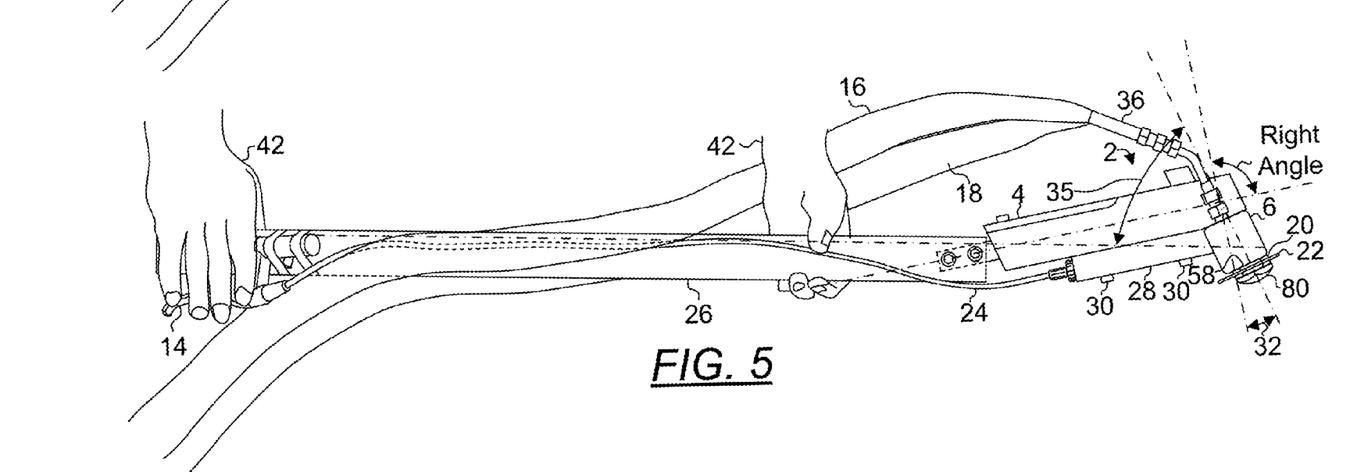
FIG. 5 depicts grasp points of the embodiment of the present plural component spray gun of FIG. 4.

FIG. 4 is an orthogonal view according to another embodiment of the present plural component spray gun. FIG. 5 depicts grasp points of the embodiment of the present plural component spray gun of FIG. 4 where a first hand is placed in the vicinity of one end of a pole 26 and a second hand in the vicinity of another end where a trigger 14 is disposed. The receiver block 6 is disposed at a tilt angle 32 with respect to handle 4. In one embodiment, the tilt angle 32 ranges from about 0 degrees to about 20 degrees. The pole 26 is disposed at angle 34 relative to handle 4. In one embodiment, angle 34 ranges from about 0 degrees to about 20 degrees. In one embodiment, the pole 26 is disposed such that the angle 35 made between the receiver block 6 and the pole 26 ranges from about 75 degrees to about 120 degrees. In one embodiment, the length 88 of the pole is about 3 ft. It shall be noted that as the combined weight including the receiver block 6, nozzle block 8 and handle 4 is low at about 1.75 lbs, the present spray gun 2 is especially suitable to be equipped with a pole 26. In one embodiment, the pole is a fixed length rod. In another embodiment, the pole is a telescopic rod, i.e., whose length is capable of being modified to suit a user's preference. FIGS. 4 and 5 are shown with a C-shaped lock 20 disposed between the stop 80 and the front face 58 of the receiver block 6. A pin 22 is disposed across the opening of the C-shaped lock 20 to prevent dislodgement of the C-shaped lock 20. It its locked position, the nozzle block 8 is prevented to assume a position where the mixing chamber including the feed and main passageways is in fluid communication with the receiver channels. In another embodiment, it is also conceivable that a pole 26 can be pivotably connected directly to the receiver block 6.

Figures 5A, 6:
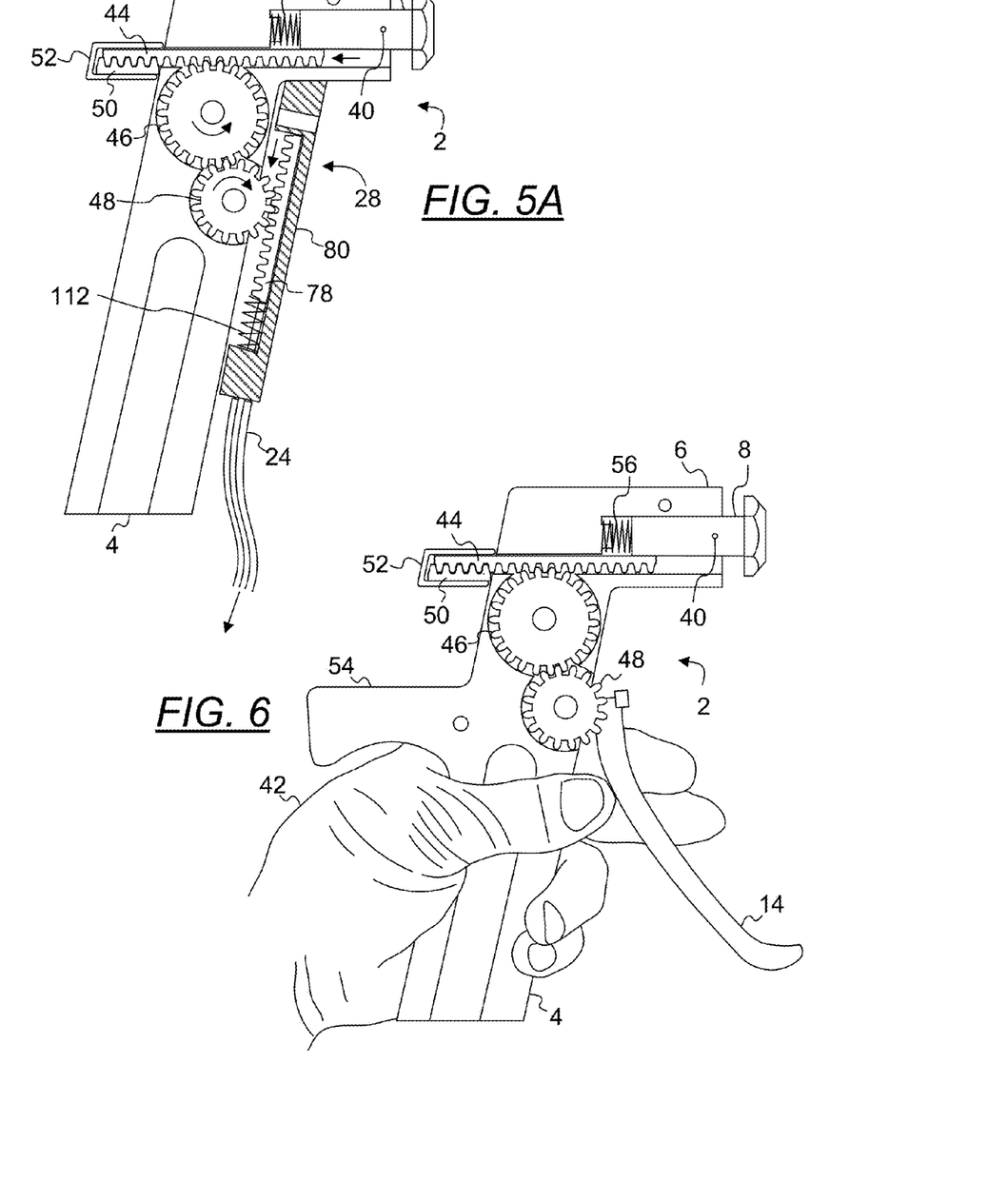
FIG. 5A is a partially transparent side orthogonal view of one embodiment of the present plural component spray gun, depicting the actuation mechanism details of the spray gun of FIGS. 4 and 5.
FIG. 6 is a partially transparent side orthogonal view of one embodiment of the present plural component spray gun, depicting the interior details of the spray gun while disposed in the blocked state.

FIG. 5A is a partially transparent side orthogonal view of one embodiment of the present plural component spray gun, depicting the actuation mechanism details of the spray gun of FIGS. 4 and 5. The present actuation mechanism includes a first rack-and-pinion assembly 44, 46, where the rack 44 of the first rack-and-pinion assembly is fixedly attached to the nozzle block 8 and the nozzle block 8 is slidingly connected to the receiver block 6, a rack actuator 28 or a second rack-and-pinion assembly 78, 48, where the pinion/spur gear 48 of the second rack-and-pinion assembly is rotationally coupled with the pinion 46 of the first rack-and-pinion assembly and a remotely disposed trigger 14 (not shown in FIG. 5A) operably connected to the rack 78 of the second rack-and-pinion assembly via cable 24. One or more fasteners 30, e.g., screws are used to secure the rack actuator 28 to the handle 4. When the trigger 14 is actuated, the nozzle block 8 is disposed in its actuated position and when the trigger is de-actuated, the nozzle block 8 is disposed in its blocked position. A pull of a trigger 14 causes cable 24 to pull the rack 78 against the return spring 112 and the pinions 46, 48 to rotate and the rack 44 in the directions indicated on FIG. 5A, retracting the nozzle block 8 relative to the receiver block 6, exposing feed passageways 38, 40 to receiver channels 74, 76, respectively. An adaptor 36 connects a hose 16, 18 at an inlet 12 to the spray. In some circumstances, it may be beneficial to secure the supply hoses, e.g., with ties, to the pole 26 to reduce the potential for entanglement of hoses, spray gun and other equipment.

Figure 7:
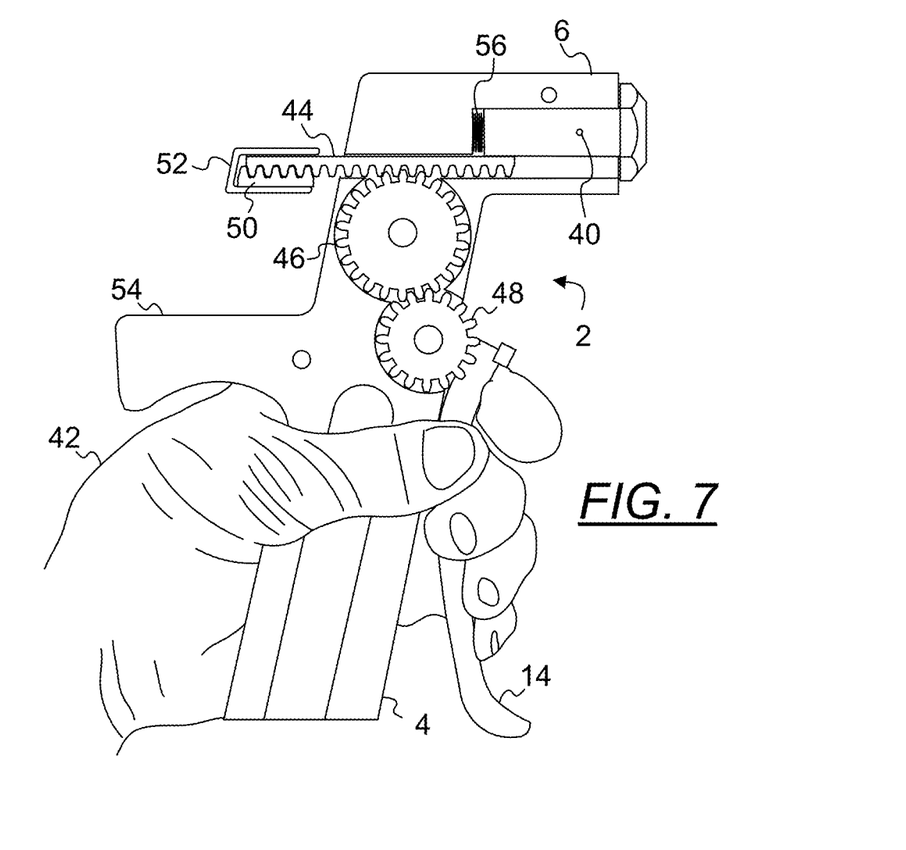
FIG. 7 is a partially transparent side orthogonal view of one embodiment of the present plural component spray gun, depicting the interior details of the spray gun while disposed in the actuated state.

FIG. 6 is a partially transparent side orthogonal view of one embodiment of the present plural component spray gun 2, depicting the interior details of the spray gun 2 while disposed in the blocked state. FIG. 7 is a partially transparent side orthogonal view of one embodiment of the present plural component spray gun 2, depicting the interior details of the spray gun 2 while disposed in the actuated state. In shall be noted that the nozzle block 8 is slidingly disposed within a cavity of the receiver block 6. When the trigger 14 is disposed in its uncompressed state, a return spring 56 disposed on one end of the cavity urges the nozzle block 8 in a direction such that feed passageway 40 is disposed out of alignment with receiver channel 76 (see FIG. 9), blocking any fluid communication between feed passageway 38, 40 and receiver channel 74, 76. An actuation mechanism is provided to put the nozzle block 8 in a desired state by the use of a trigger 14. The rack 44 of a rack-and-pinion assembly 44, 46 is fixedly attached to the receiver block 6. A handle assembly including a handle 4 and a trigger 14 having a gear 48 rotationally coupled with the pinion of the rack-and-pinion assembly 44, 46. When the trigger 14 is pulled towards the handle 4 (or squeezed) as shown in FIG. 7, the nozzle block 8 is disposed in its actuated position and when the trigger is released or moved away from the handle 4 (or returned to its normal position), the nozzle block 8 returns to its blocked position.

Figure 8:
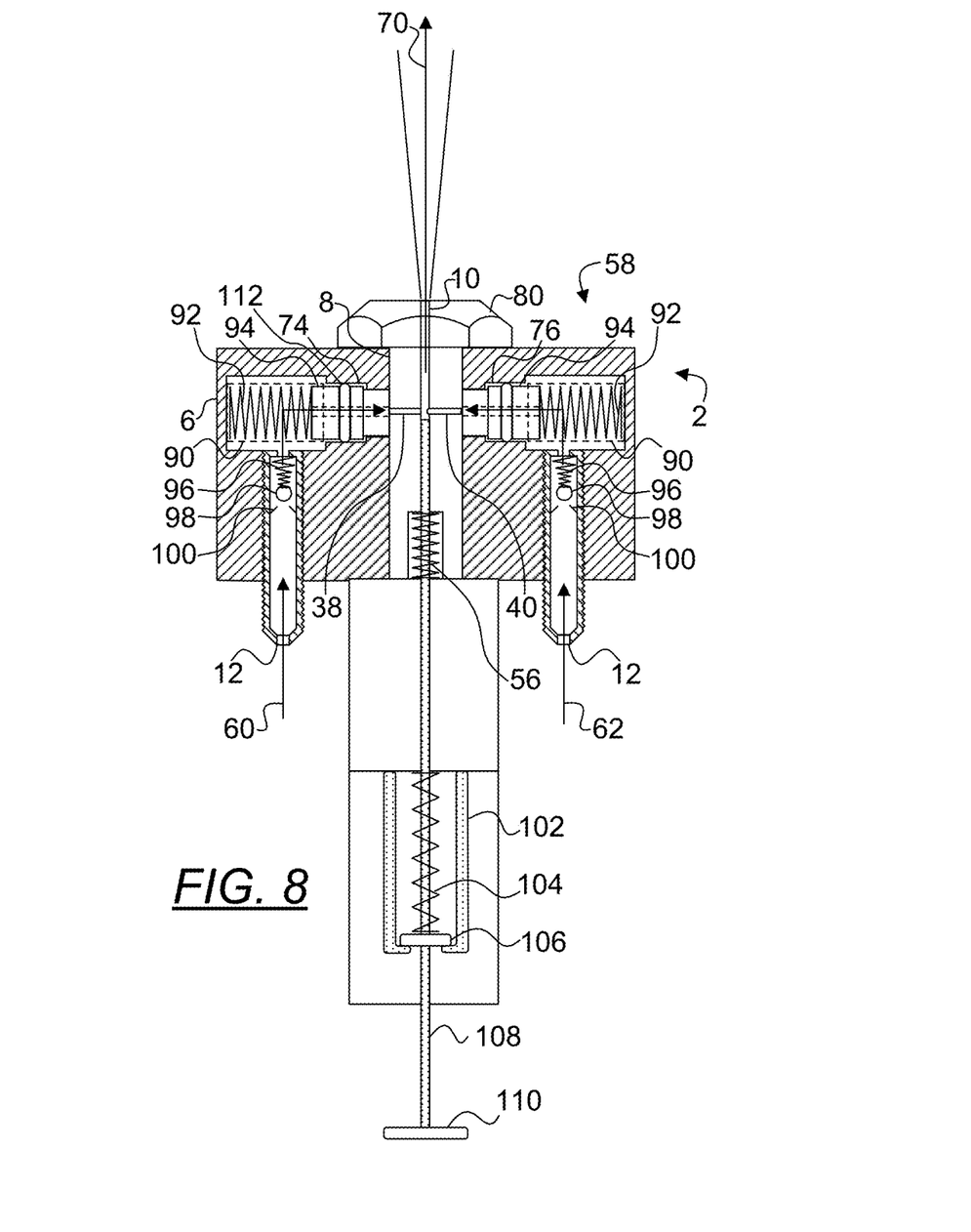
FIG. 8 is a partially transparent top orthogonal view of one embodiment of the present plural component spray gun, depicting the alignment of the mixing chamber with respect to the receiver block while the spray gun is disposed in the actuated state.
Figure 9:
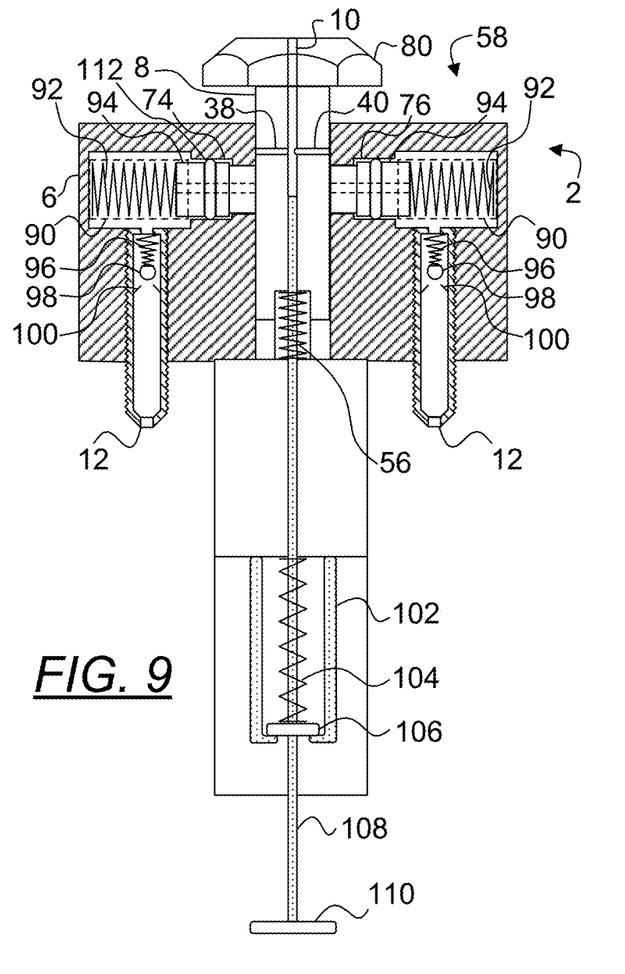
FIG. 9 is a partially transparent top orthogonal view of one embodiment of the present plural component spray gun, depicting the alignment of the mixing chamber with respect to the receiver block while the spray gun is disposed in the blocked state.

FIG. 8 is a partially transparent top orthogonal view of one embodiment of the present plural component spray gun 2, depicting the alignment of the mixing chamber with respect to the receiver block 6 while the spray gun is disposed in the actuated state. It shall be noted that the nozzle block 8 is disposed such that feed passageways 38 and 40 are disposed in alignment with receiver channels 74 and 76, respectively, enabling fluid communication between the receiver block 6 which receives, via inlet ports 12, materials that will be mixed in the main passageway 10 to produce a mixture 70. In one embodiment, each flow path through the receiver block 6 involves filtering and a check valve. As a flow is permitted (when the nozzle block is disposed in its actuated state) in each path, a check ball 98 is urged against a conical spring 96 and becomes unseated from its seat 100 to create an opening. A flow then proceeds through a filter 90 which prevents any large solids from entering or plugging a feed passageway 38, 40. During operation, as the nozzle block 8 is moved relative to the receiver block 6, wear occurs to contact surfaces which can lead to leaks, especially at the typical operating pressure of about 3500 psi. As such, it is essential to ensure that there exist no gaps sufficient to cause leaks along any of the moving parts. Although the contact surfaces may be curved, the Applicant discovered that by using planar contact surfaces as disclosed herein, leakages can be eliminated despite numerous cycles of operation of the present spray gun. In order to eliminate leaks, a side seal 94 and a spring 92 are used. The side seal 94 is essentially a cylindrical block having an O-ring disposed about its outer periphery, a spring end, a nozzle block end and an opening disposed along its central axis which allows a material to flow through to a feed passageway 38, 40 of a nozzle block 8 in an actuated state at the nozzle block end. The side seal 94 is capable of maintaining pressures up to 3500 psi as spring 92 urges the side seal 94 at the spring end of the side seal 94 against the nozzle block 8. The O-ring is configured to press against a cylindrical shaped wall within a receiver channel 74, 76 such that material flow occurs through the opening of the side seal 94 instead of the exterior surfaces of the side seal 94. A stop 80 disposed at the tip of the nozzle block 8 serves as a travel limit for the nozzle block in its actuated position when the stop 80 contacts the front face 58 of the receiver block 6. Upon release of the trigger 14, the spray gun 2 returns to its blocked position as shown in FIG. 9. Although the present spray gun 2 is capable of operation without a resident or built-in cleaning device, when adherence of materials to parts becomes an issue, the present mechanical means for cleaning the mixing chamber makes cleaning readily available without additional tools. In the embodiments shown in FIGS. 8-11, the main passageway 10 extends rearwardly toward the rear end of the spray gun 2 and penetrates the rear end of the spray gun. Alternatively, in a spray gun not equipped with a resident cleaning device, the main passageway is configured to terminate at a location close to the openings exit ports of the feed passageways 38, 40. A valving rod 108 of suitable diameter is inserted via the rear of spray gun and slidingly disposed in a portion of the main passageway 10 and secured with a retaining mechanism. The retaining mechanism includes a flange 106 fixedly disposed on a portion along the length of the valving rod 108 and a limiter 102 configured to limit the travel of valving rod 108 away from the spray gun. A compression spring 104 is disposed between the rear of the spray gun 2 and the flange 106 to return the valving rod 108 to its normal position. A push knob 110 is disposed at the exposed end of the valving rod 108 to facilitate grasping of the valving rod 108 for cleaning the main passageway 10. In one embodiment, a suitable diameter of each feed passageway ranges from about 0.016 inch to about 0.052 inch and a suitable diameter of the main passageway 10 ranges from about 0.06 inch to about 0.093 inch. Suitable diameters of the feed passageways and the main passageway are critical in causing proper mixing and dispensing of materials.

FIG. 9 is a partially transparent top orthogonal view of one embodiment of the present plural component spray gun, depicting the alignment of the mixing chamber with respect to the receiver block 6 while the spray gun is disposed in the blocked state. It shall be noted that the nozzle block 8 is disposed such that feed passageways 38 and 40 are disposed out of alignment with receiver channels 74 and 76, respectively, preventing fluid communication between the receiver block 6 which receives, via inlet 12, materials ready to be mixed in the main passageway 10.

Figure 10:
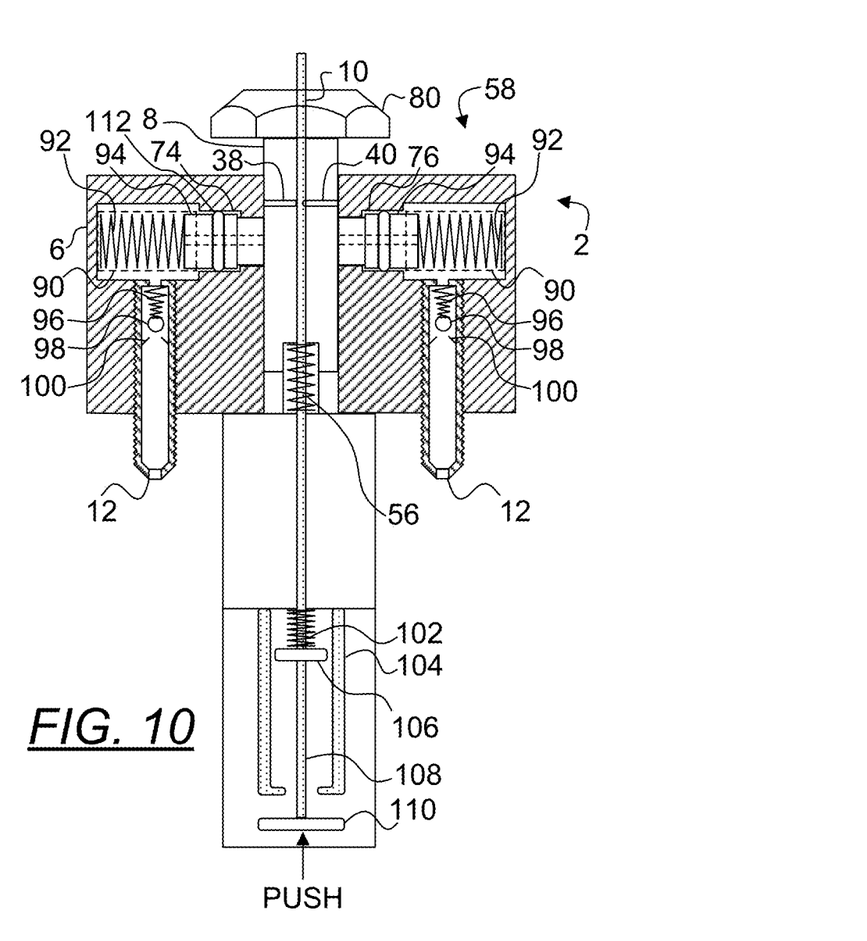
FIG. 10 is a partially transparent top orthogonal view of one embodiment of the present plural component spray gun, depicting the alignment of the mixing chamber with respect to the receiver block while the spray gun is disposed in the blocked state and the valving rod is actuated to clear the main passageway of the main passageway.

FIG. 10 is a partially transparent top orthogonal view of one embodiment of the present plural component spray gun, depicting the alignment of the mixing chamber with respect to the receiver block while the spray gun is disposed in the blocked state and the valving rod is actuated to clear the main passageway of the main passageway 10. It shall be noted that as the valving rod 108 is being pushed at push knob 110, the valving rod 108 advances to a point where it protrudes from the front end of the main passageway 10, removing any materials previously left in the main passageway 10.

Figure 11:
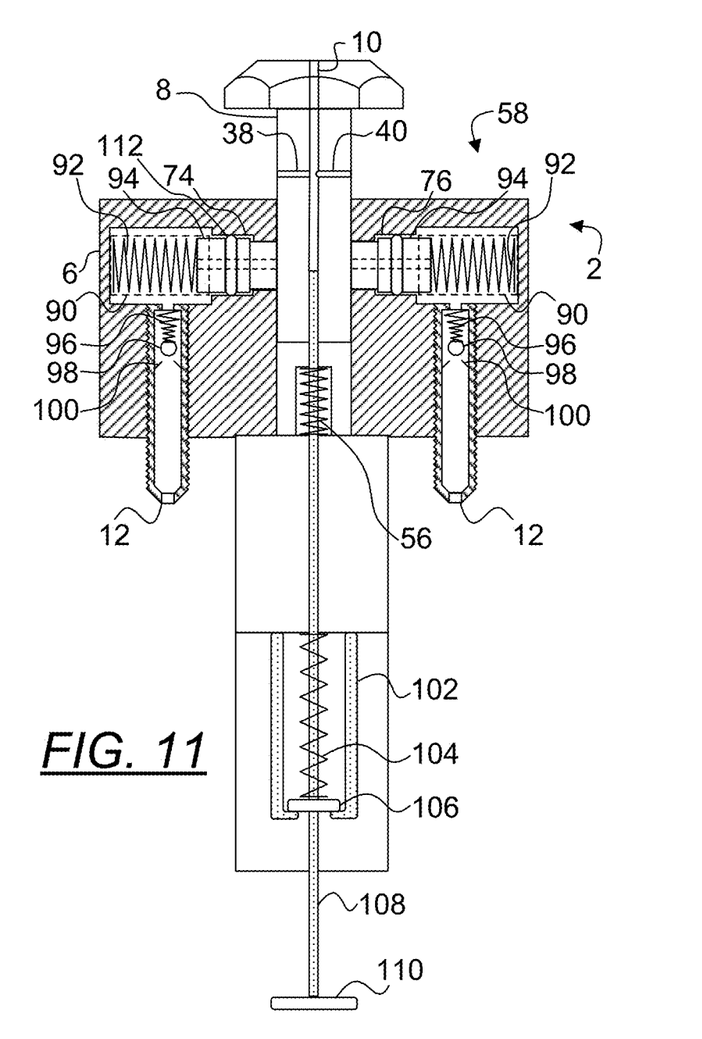
FIG. 11 is a partially transparent top orthogonal view of one embodiment of the present plural component spray gun, depicting the alignment of the mixing chamber with respect to the receiver block while the spray gun is disposed in a state for cleaning.

FIG. 11 is a partially transparent top orthogonal view of one embodiment of the present plural component spray gun, depicting the alignment of the mixing chamber with respect to the receiver block 6 while the spray gun is disposed in the blocked state and the valving rod is actuated to clear the main passageway 10. As shown, the nozzle block 8 is slid beyond the front face 58 of the receiver block 6 such that the entry ports of the feed passageways 38 and 40 are fully exposed. Referring again to FIG. 6, in order to achieve the nozzle block 8 position for cleaning, the retainer 52 is first removed such that the complementary rack 50 can be subsequently removed. The trigger 14 is pulled away from the spray gun 2, causing entry ports of the feed passageways 38, 40 to be slid beyond the front face 58 of the receiver block 6 and exposed. A cleaning tool, e.g., a drill bit, sufficiently similar in size but slightly smaller in diameter than each of the feed passageways may be inserted within such passageways so that any hardened materials within such passageways may be pushed out. The nozzle of a syringe may be inserted in any of the passageways to supply a stream of plasticizer or synthetic Automatic Transmission Fluid (ATF) fluid or air to aid in dislodging and removing any undesired materials from the nozzle block 8. The main passageway 10 can be cleaned with the nozzle block 8 in its extended position as shown in FIG. 10 or in its actuated or blocked positions as shown in FIG. 8 as the passageway 10 is accessible in any of these positions. The passageways 38, 40, 10 are preferably rectilinear to make insertion with a rigid tool and operation of a cleaning tool easier.

Figure 12:
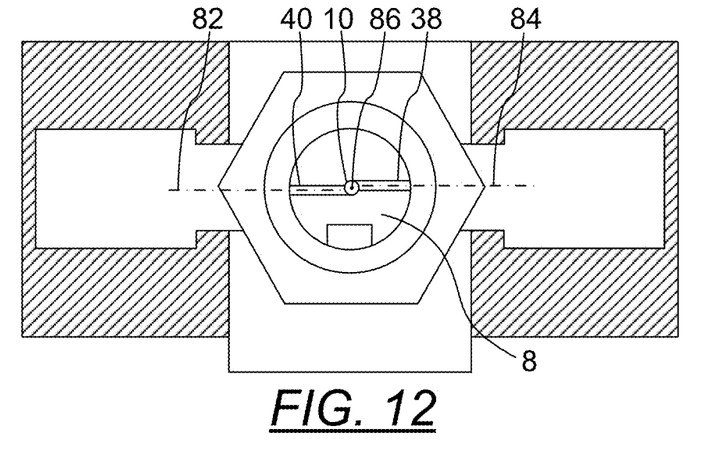
FIG. 12 is a partially transparent front orthogonal view of one embodiment of the present nozzle block and receiver block, depicting the configuration of the first and second passageways which cause mixing of materials.

FIG. 12 is a partially transparent front orthogonal view of one embodiment of the present nozzle block and receiver block, depicting the configuration of the first and second passageways which cause mixing of materials in the main passageway 10 when materials 60, 62 are received through passageways 38, 40. It shall be noted that the first feed passageway 38 is preferably disposed out of alignment from the second passageway 40 as the central axis 82 of feed passageway 40 is not disposed in a co-axial relationship with the central axis 84 of feed passageway 38.

While the preferred embodiment of the invention has been illustrated and described, it will be appreciated that various changes can be made therein without departing from the spirit and scope of the invention.

What is claimed herein is:

1. A plural component spray gun consisting of:
   (a) a nozzle block having a first feed passageway, a second feed passageway and a main passageway, wherein said main passageway is configured to receive a first material through said first feed passageway and a second material through said second feed passageway; and
   (b) a receiver block having a pole, a first receiver channel and a second receiver channel, each of said first receiver channel and said second receiver channel comprises an entry port at one end and an exit port at another end, wherein said receiver block is adapted to selectively receive said nozzle block in:
      (i) an actuated position, wherein said exit port of said first receiver channel is fluidly connected with said first feed passageway and said exit port of said second receiver channel is fluidly connected with said second feed passageway;
      (ii) a blocked position, wherein said exit port of said first receiver channel is fluidly blocked from said first feed passageway and said exit port of said second receiver channel is fluidly blocked with said second feed passageway;
   (c) an actuation mechanism comprising:
      (i) a first rack-and-pinion assembly, wherein the rack of said first rack-and-pinion assembly is fixedly attached to said nozzle block and said nozzle block is slidingly connected to said receiver block; and
      (ii) a second rack-and-pinion assembly, wherein the pinion of said second rack-and-pinion assembly is rotationally coupled with the pinion of said first rack-and-pinion assembly; and
   (d) a cleaning mechanism having a valving rod adapted to be inserted through said main passageway for clearing left-over materials.

2. The plural component spray gun of claim 1, wherein said actuation mechanism further comprises
   a handle assembly comprising a handle having a central axis and a trigger having a gear rotationally coupled with the pinion of said rack-and-pinion assembly.

3. The plural component spray gun of claim 2, wherein said wherein said actuating mechanism further comprises a horn extending from a portion of said handle, wherein said horn is configured to be an additional handhold.

4. The plural component spray gun of claim 1, wherein the pole comprises a first end attached to said receiver block.

5. The plural component spray gun of claim 1, wherein the actuation mechanism further comprises
   a remotely disposed trigger operably connected to the rack of said second rack-and-pinion assembly, wherein when said trigger is actuated, said nozzle block is disposed in said actuated position and when said trigger is de-actuated, said nozzle block is disposed in said blocked position.

6. The plural component spray gun of claim 1, wherein the actuation mechanism further comprises
   a handle assembly comprising a pole having a first end and a second end wherein a trigger is disposed at said second end and is operably connected to the rack of said second rack-and-pinion assembly, and wherein said first end is attached to said receiver block and wherein said trigger is moved towards said pole, said nozzle block is disposed in said actuated position and wherein said trigger is moved away from said pole, said nozzle block is disposed in said blocked position.

7. The plural component spray gun of claim 1, wherein the pole comprises a first end and a second end, wherein said first end is pivotally connected to said receiver block.

8. The plural component spray gun of claim 7, wherein the actuation mechanism is disposed on said second end.

9. The plural component spray gun of claim 1, wherein each of said first feed passageway, said second feed passageway and said main passageway is substantially rectilinear.

10. A plural component spray gun consisting of:
    (a) a nozzle block comprising a mixing chamber having at least one feed passageway, said at least one feed passageway having an entry port on a first surface and an exit port; and
    (b) a receiver block comprising a main passageway, a pole, and at least one receiver channel adapted to receive a material, wherein said at least one receiver channel comprises an entry port disposed at one end and an exit port at another end on a second surface,
    wherein said first surface is adapted to move relative to said second surface such that when said entry port of said at least one feed passageway is disposed in alignment with said exit port of said at least one receiver channel, said at least one feed passageway is in fluid communication with said at least one receiver channel and when said entry port of said at least one feed passageway is not disposed in alignment with said exit port of said at least one receiver channel, said at least one feed passageway is not in fluid communication with said at least one receiver channel;

(c) an actuation mechanism comprising:
 (i) a first rack-and-pinion assembly, wherein the rack of said first rack-and-pinion assembly is fixedly attached to said nozzle block and said nozzle block is slidingly connected to said receiver block; and
 (ii) a second rack-and-pinion assembly, wherein the pinion of said second rack-and-pinion assembly is rotationally coupled with the pinion of said first rack-and-pinion assembly; and (d) a cleaning mechanism having a valving rod adapted to be inserted through said main passageway for clearing left-over materials.

11. The plural component spray gun of claim 10, wherein each of said first surface and said second surface is a planar surface.

12. The plural component spray gun of claim 10, wherein the main passageway comprises a central axis and a diameter, wherein said main passageway is configured to receive a first material through a first one of said at least one feed passageway and a second material through a second one of said at least one feed passageway and wherein each of said at least one feed passageways further comprises a central axis and a diameter.

13. The plural component spray gun of claim 12, wherein each of said central axis of said at least one feed passageway and said central axis of said main passageway is substantially rectilinear.

14. The plural component spray gun of claim 12, wherein each of said diameter of said at least one feed passageway is about 0.04 inch and said diameter of said main passageway is about 0.07 inch.

15. The plural component spray gun of claim 10, wherein the pole having a first end and a second end, wherein said first end is pivotably connected to said receiver block.

16. The plural component spray gun of claim 15, wherein the actuation mechanism is disposed on said second end.

17. A spray gun consisting of:
(a) a chamber configured to selectively dispense at least one material, wherein said chamber consists of:
 (i) a nozzle block comprising a first feed passageway having a central axis and a second feed passageway having a central axis;
 (ii) a receiver block comprising a main passageway having a central axis,
 wherein said main passageway is configured to receive a first material through said first feed passageway and a second material through said second feed passageway and said central axis of said first feed passageway is disposed non-coaxially with said central axis of said second feed passageway such that said first material can be mixed with said second material;

(b) a pole having a first end and a second end, wherein said pole is pivotably connected at said first end to said chamber; and (c) an actuating mechanism comprising a trigger disposed at said second end, wherein said trigger is operably connected to said chamber;

(d) an actuation mechanism comprising:
 (i) a first rack-and-pinion assembly, wherein the rack of said first rack-and-pinion assembly is fixedly attached to said nozzle block and said nozzle block is slidingly connected to a receiver block for placing the receiver block between an actuated position and a blocked position; and
 (ii) a second rack-and-pinion assembly, wherein the pinion of said second rack-and-pinion assembly is rotationally coupled with the pinion of said first rack-and-pinion assembly; and (e) a cleaning mechanism having a valving rod adapted to be inserted through said main passageway for clearing left-over materials.

18. The spray gun of claim 17, wherein each of said central axis of said first feed passageway, said central axis of said second feed passageway and said central axis of said main passageway is substantially rectilinear.

* * * * *